United States Patent
Fontaine

(10) Patent No.: US 9,615,563 B2
(45) Date of Patent: Apr. 11, 2017

(54) DOUBLE ENDED FISHING WORM CANISTER

(71) Applicant: Sylvain Fontaine, La Baie (CA)

(72) Inventor: Sylvain Fontaine, La Baie (CA)

(*) Notice: Subject to any disclaimer, the term of this patent is extended or adjusted under 35 U.S.C. 154(b) by 782 days.

(21) Appl. No.: 13/900,580

(22) Filed: May 23, 2013

(65) Prior Publication Data

US 2014/0345187 A1   Nov. 27, 2014

(51) Int. Cl.
*A01K 97/00* (2006.01)
*A01K 97/04* (2006.01)

(52) U.S. Cl.
CPC .................... *A01K 97/04* (2013.01)

(58) Field of Classification Search
CPC ................. A01K 97/04; A01K 97/05
USPC .................. 43/54.1, 55; 225/39, 43
See application file for complete search history.

(56) References Cited

U.S. PATENT DOCUMENTS

| | | |
|---|---|---|
| 1,150,778 A | 8/1915 | Lamb |
| 2,326,414 A | 8/1943 | Thompson |
| 2,507,319 A | 5/1950 | Peters |
| 3,423,869 A | 1/1969 | Duerst |
| 5,118,021 A * | 6/1992 | Fiocchi .......................... 225/103 |
| 5,481,823 A | 1/1996 | Hoover et al. |
| 6,442,887 B2 | 9/2002 | Sanquist |
| 2001/0045050 A1* | 11/2001 | Sanquist ........................... 43/55 |
| 2003/0005617 A1* | 1/2003 | Holverson ........................ 43/41 |

FOREIGN PATENT DOCUMENTS

| | | |
|---|---|---|
| FR | 1106118 | 7/1955 |
| GB | 2391863 | 2/2004 |

\* cited by examiner

*Primary Examiner* — Kristen C Hayes

(57) ABSTRACT

A double ended fishing worm canister in a double ended canister for storing and using worms as bait for fishing. The canister has a cylindrical body having a top end and a bottom end, a first lid removably attached to the top end, and a second lid removably attached to the bottom end. The first lid includes a container therein having a pivoting cover attached thereto, the pivoting cover includes at least one side wall adapted to cut worms into separate pieces, such that the canister is adapted to store worms and dirt therein, be opened and closed from either end, and cut worms into separate pieces for use as bait for fishing.

11 Claims, 6 Drawing Sheets

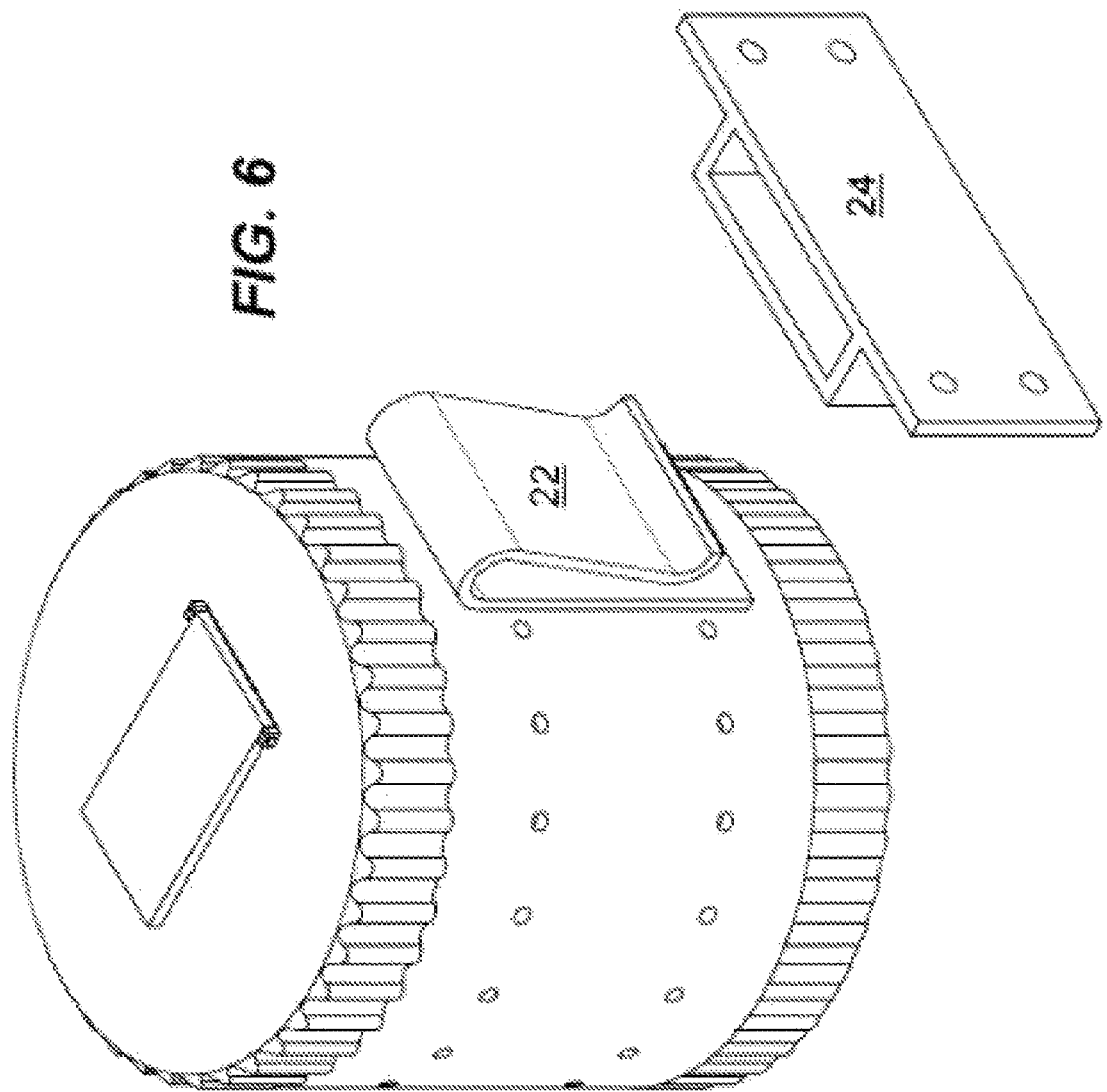

DOUBLE ENDED FISHING WORM CANISTER

This application claims priority based on request GB1209900.8 filed Jun. 2, 2012

FIELD OF THE INVENTION

The present invention relates generally to fishing equipment but more particularly to a double ended fishing worm canister.

BACKGROUND OF THE INVENTION

Worms are still popular as bait for fish. Canisters filled with dirt are generally used for keeping worms over an extended period of time. The problem with canisters is that worms tend to dig deep into the container and one has.

SUMMARY OF THE INVENTION

In view of the foregoing disadvantages inherent in the known devices now present in the prior art, the present invention, which will be described subsequently in greater detail, is to provide objects and advantages which are:

To provide for a double ended canister that has a lid at each end of the container so that if worms can't be easily found on one end, there is always the other end of the container which can be reached by opening the other lid. Other features include a worm cutter with its own smaller container to store the remaining worm part as well as an integrated belt clip to conveniently carry the canister.

In order to do so, the invention consists in a double ended canister for storing and using worms as bait for fishing. The canister has a cylindrical body having a top end and a bottom end, a first lid removably attached to the top end, and a second lid removably attached to the bottom end. The first lid includes a container therein having a pivoting cover attached thereto, the pivoting cover includes at least one side wall adapted to cut worms into separate pieces, such that the canister is adapted to store worms and dirt therein, be opened and closed from either end, and cut worms into separate pieces for use as bait for fishing.

The double ended canister has the pivoting cover, and the at least one side wall form a worm cutter assembly and the pivoting cover is formed as a flip cover, and the at least one side wall is formed as a blade.

The lid further includes a container therein having a pivoting cover attached thereto, the pivoting cover including at least one side wall adapted to cut worms into separate pieces.

The pivoting cover, and the at least one side wall form a worm cutter assembly, and the pivoting cover is formed as a flip cover, and the at least one side wall is formed as a blade.

The pivoting cover includes two side walls formed as blades and are both adapted to cut worms into separate pieces.

The pivoting cover of the second lid container includes two side walls formed as blades and are both adapted to cut worms into separate pieces.

The lids are removably attached to the ends via matching threads between the lid and the end of the canister body.

The side wall of the cylindrical body has a plurality of holes therethrough adapted to allow air to pass through for the worms to breathe and stay alive for a long duration of time.

The double ended canister has a clip member removably attached to an exterior side wall portion of the cylindrical body and adapted to clip onto a portion of a fisherman's belt.

The double ended canister is further comprised of a clip attachment member adapted to be connected to a portion of a boat, such that the clip member can clip to the clip attachment member and thereby be attached to the boat.

The double ended canister can be formed from a material chosen from a list of materials comprising steel, aluminum, plastic, and polycarbonate.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter which contains illustrated preferred embodiments of the invention.

BRIEF DESCRIPTION OF THE DRAWINGS

FIG. 6 Isometric view of the invention and how it attaches to a boat clip.

DETAILED DESCRIPTION OF THE PREFERRED EMBODIMENT

Figure 1:
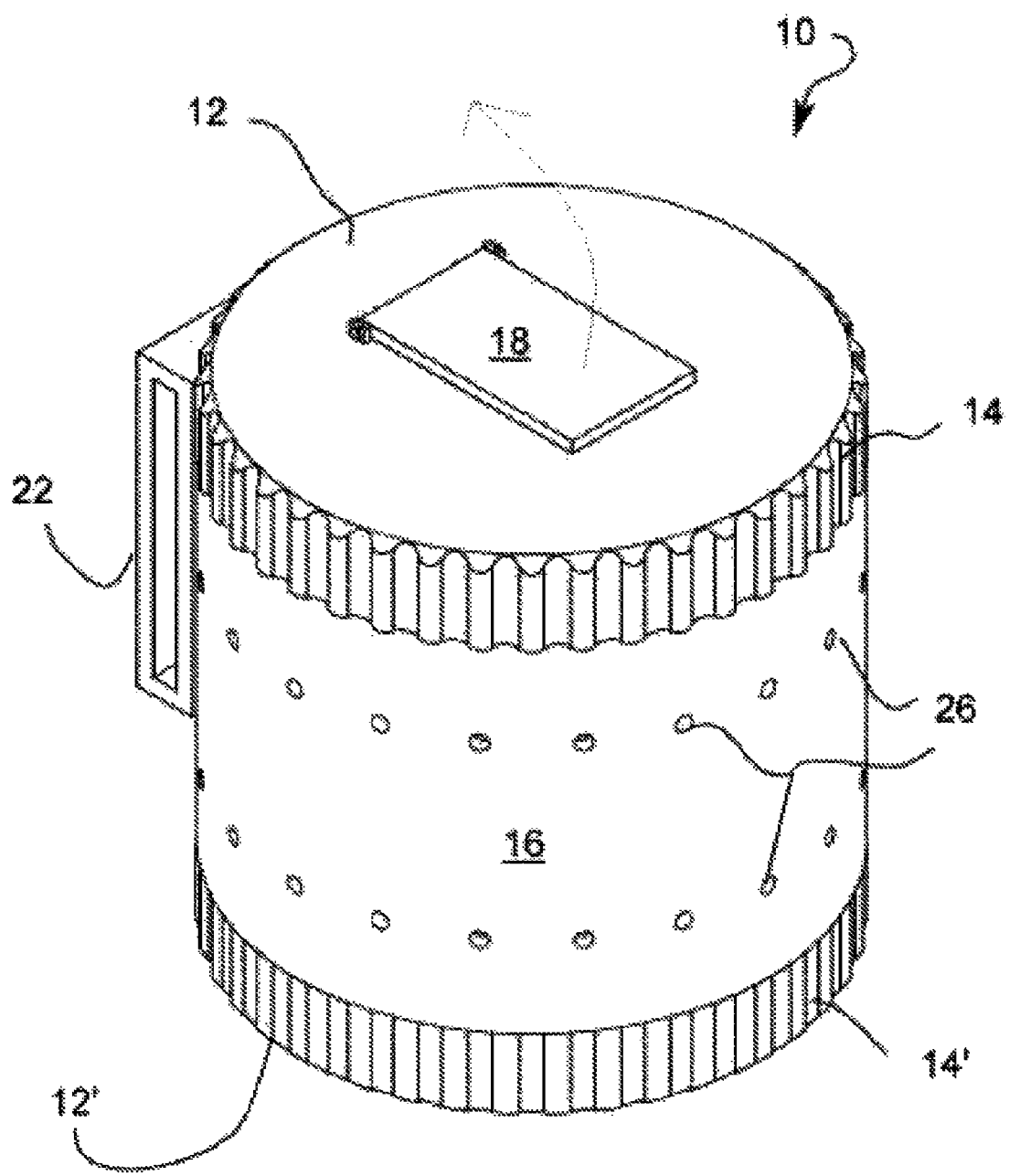
FIG. 1 Isometric view of the invention.
Figure 2:
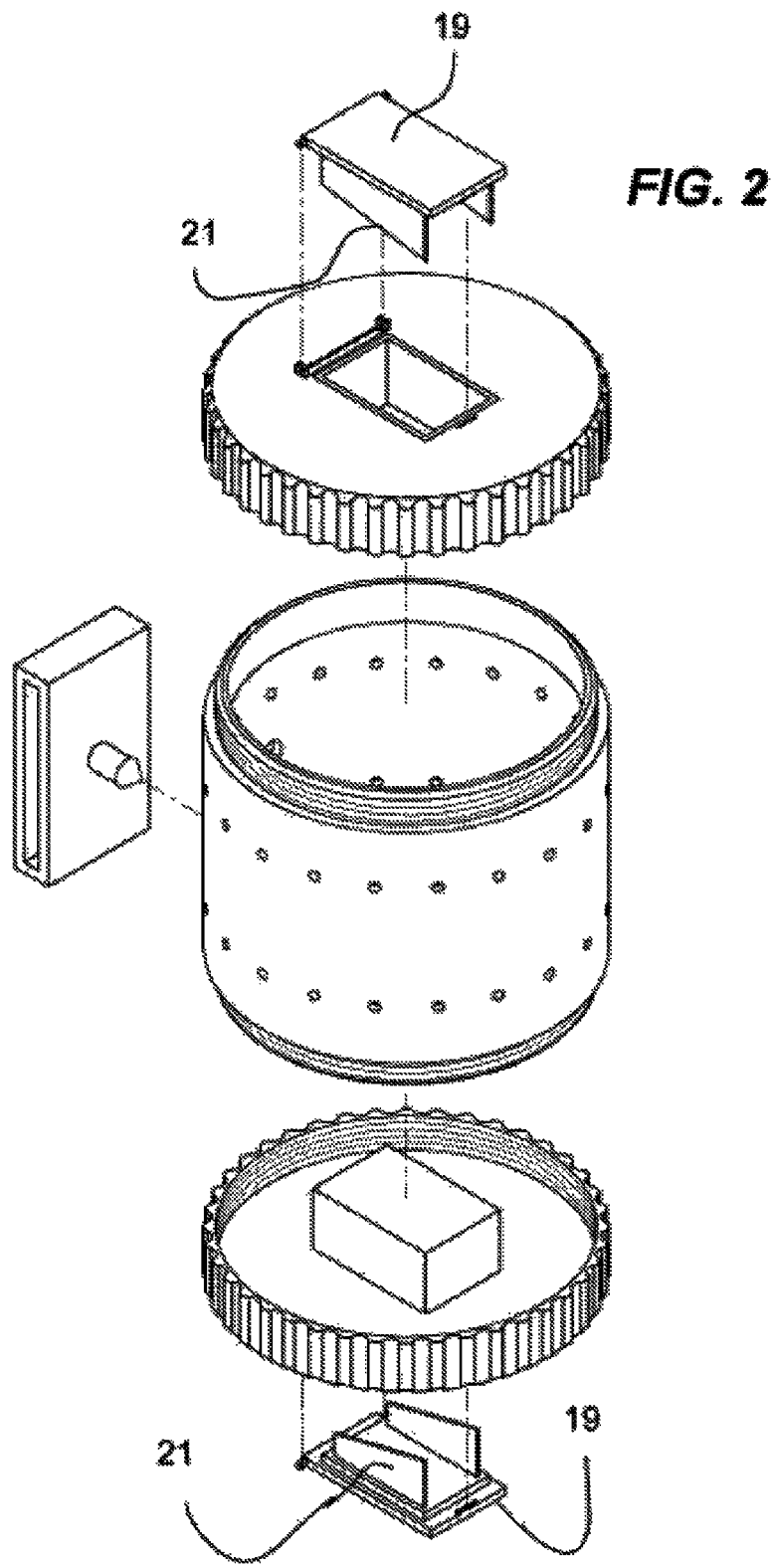
FIG. 2 Exploded view of the invention.
Figure 3A:
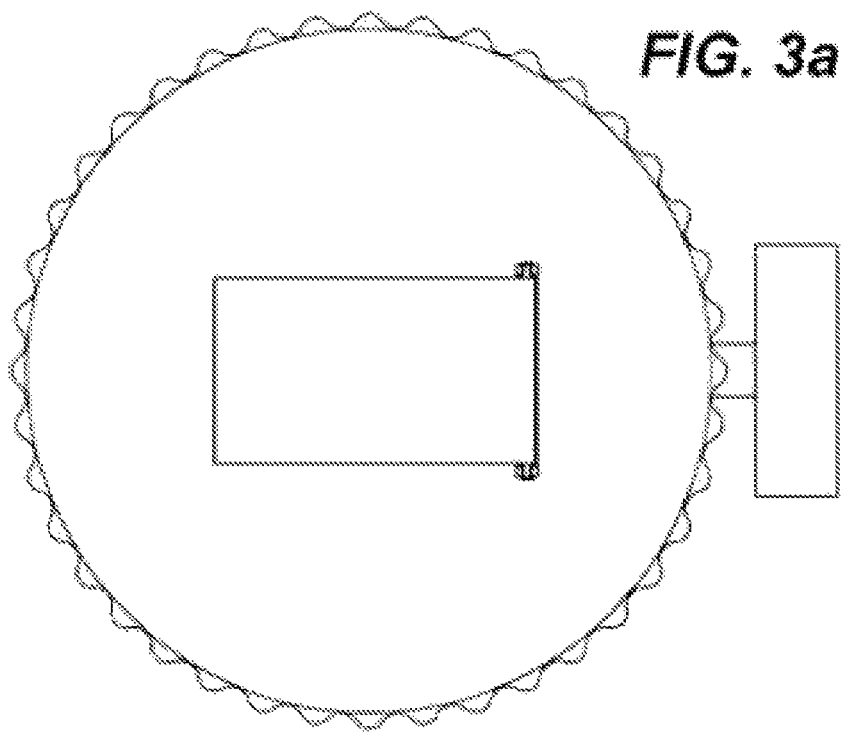
FIGS. 3a-b top and side views, respectively, of the invention.
Figure 3B:
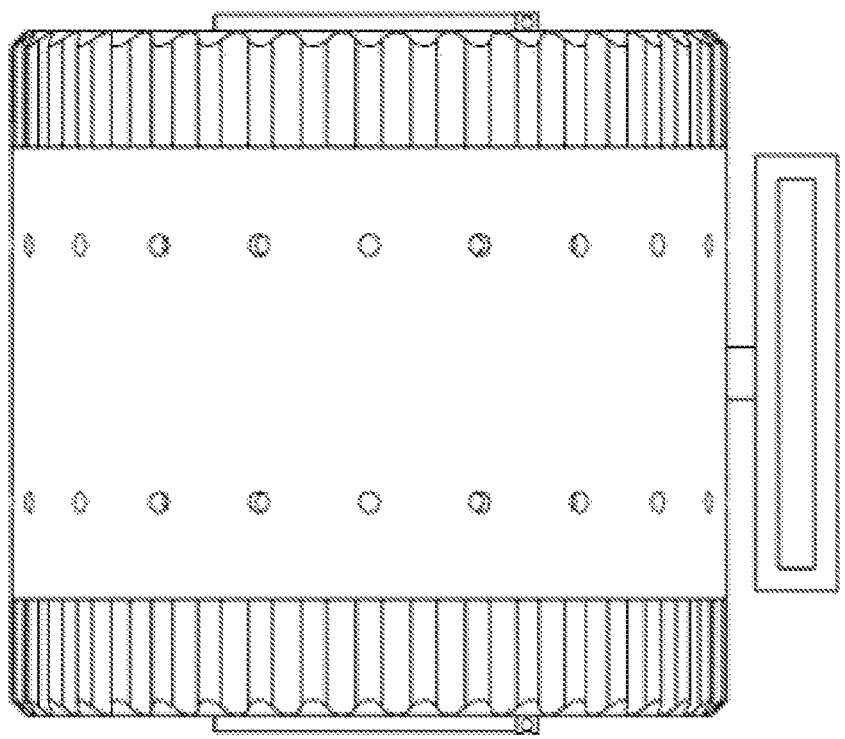
Figure 4:
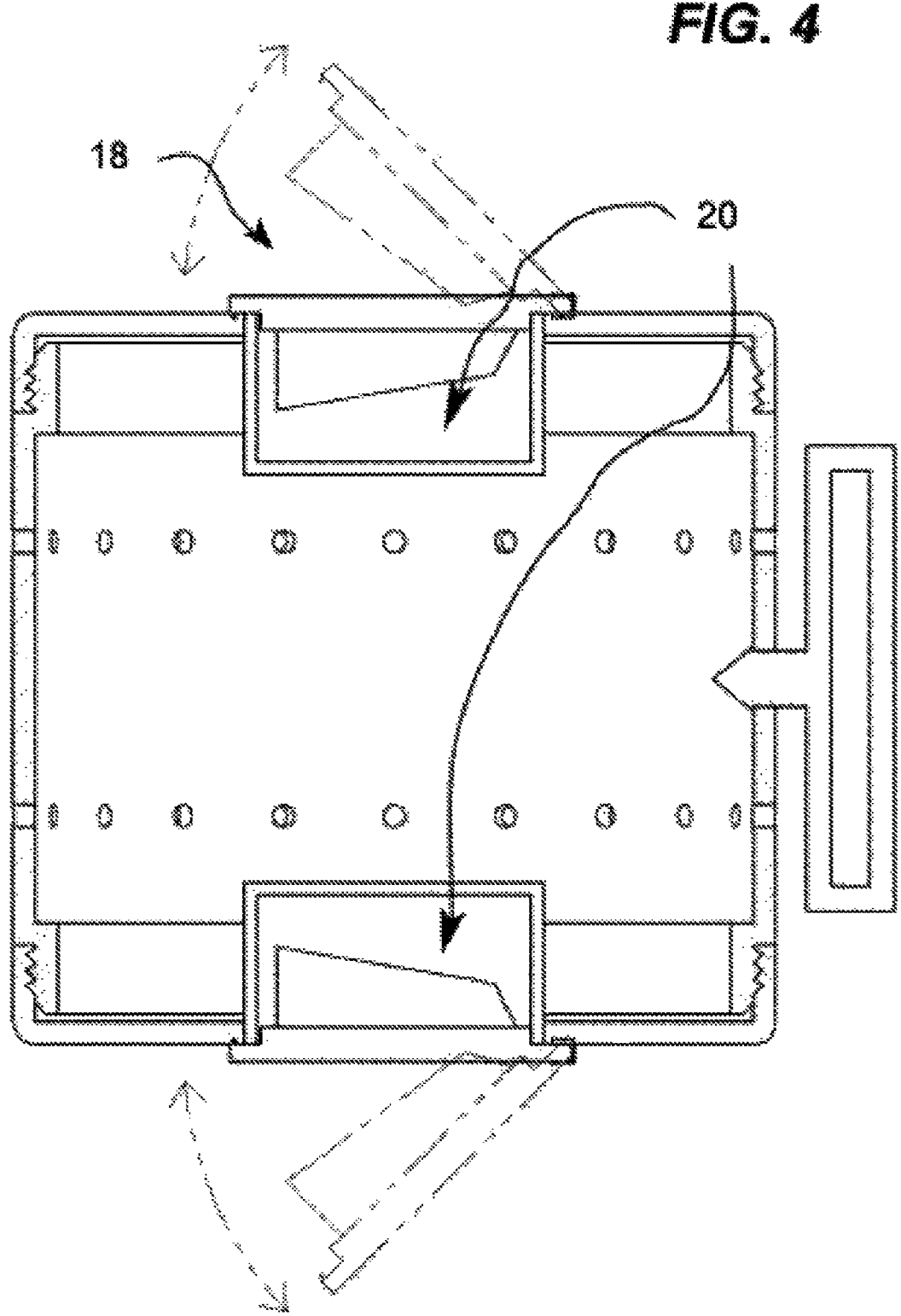
FIG. 4 Cutaway side view of the invention.
Figure 5B:
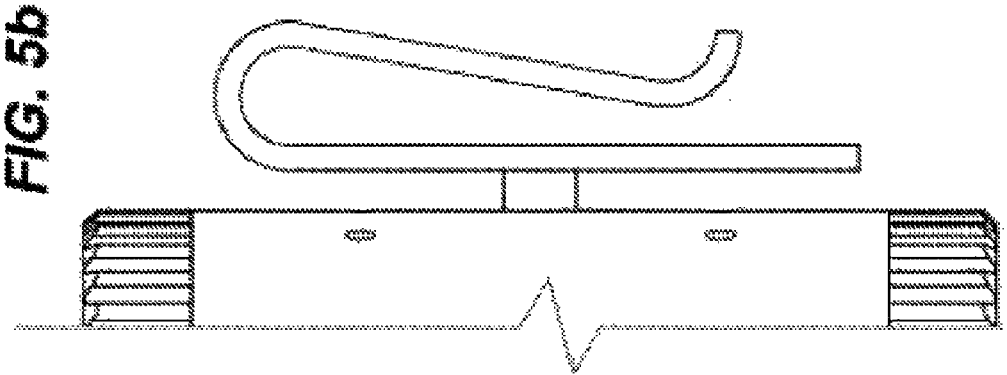
FIGS. 5a-b Side views of a belt and a boat clip.
Figure 5A:
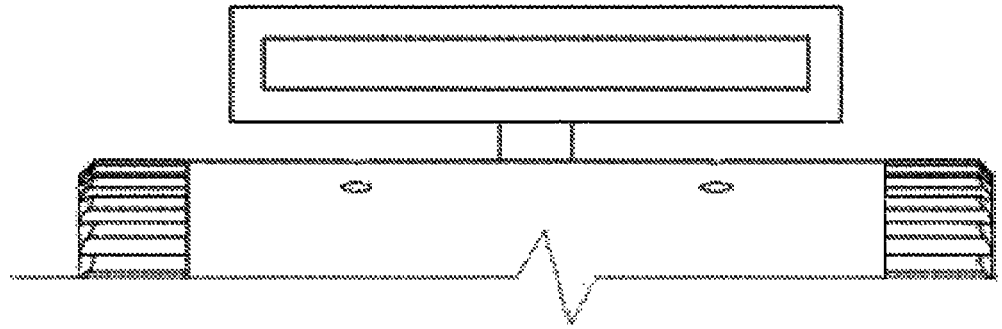

A double ended canister (10) that has a first and a second lid (12, 12') at each end (14, 14') of a container body (16) so that if worms can't be easily found on one end (14) when opening the first lid (12), there is always the opposite end (14') of the container body (16) which can be reached by opening the second lid (12'). In a preferred embodiment, the lids (12, 12') are threadably attached to the body (16) but they could alternatively be snap off lids.

Other features include a worm cutter assembly (18) located on each lid (12, 12') with its own small container (20) embedded inside the lid (12, 12') to store the remaining worm part. The worm cutter assembly (18) is further comprised of a flip cover (19) and a blade (21).

The container body (16) can also have an integrated clip (22) to conveniently carry the canister. (10) either on a belt or the clip (22) can connect to a clip attachment (24) on a boat.

Also, as is known in the art of worm canisters, the canister body (16) has a plurality of through holes (26) spread across its surface for the worms to breathe.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A double ended canister for storing and using worms as bait for fishing, said canister comprising a cylindrical body having a top end and a bottom end; a first lid removably attached to said top end, and a second lid removably attached to said bottom end, thereby defining an interior storage volume; said first lid including a container therein having a pivoting cover attached thereto, said pivoting cover includes two parallel side walls each adapted to cut worms into separate pieces, such that said bait can be cut into a predefined length defined by the distance between said two parallel side walls, such that said canister is adapted to store worms and dirt therein, be opened and closed from either end, and cut worms into separate pieces of predefined length for use as bait for fishing.

2. The double ended canister of claim 1, wherein said pivoting cover, and said two parallel side walls are formed as a worm cutter assembly; and wherein said pivoting cover is formed as a flip cover, and said two parallel side walls are formed as blades.

3. The double ended canister of claim 1, wherein said second lid further includes a container therein having a pivoting cover attached thereto, said pivoting cover including at least one side wall adapted to cut worms into separate pieces.

4. The double ended canister of claim 3, wherein said pivoting cover of said second lid, and said at least one side wall form a worm cutter assembly; and wherein said pivoting cover is formed as a flip cover, and said at least one side wall is formed as a blade.

5. The double ended canister of claim 3, wherein said pivoting cover of said second lid container includes two side walls formed as blades and are both adapted to cut worms into separate pieces.

6. The double ended canister of claim 1, wherein said first lid is removably attached to said top end via matching threads between said first lid and said top end.

7. The double ended canister of claim 1, wherein said second lid is removably attached to said bottom end via matching threads between said second lid and said bottom end.

8. The double ended canister of claim 1, wherein the side wall of said cylindrical body has a plurality of holes therethrough adapted to allow air to pass through for the worms to breathe and stay alive for a long duration of time.

9. The double ended canister of claim 1, further comprising a clip member removably attached to an exterior side wall portion of said cylindrical body and adapted to clip onto a portion of a fisherman's belt.

10. The double ended canister of claim 9, further comprising a clip attachment member adapted to be connected to a portion of a boat, such that said clip member can clip to said clip attachment member and thereby be attached to said boat.

11. The double ended canister of claim 1, wherein said canister is formed from a material chosen from a list of materials consisting of steel, aluminum, plastic, and polycarbonate.

* * * * *